US007542965B2

(12) United States Patent
Chau

(10) Patent No.: US 7,542,965 B2
(45) Date of Patent: *Jun. 2, 2009

(54) METHOD, APPARATUS, AND COMPUTER-READABLE MEDIUM FOR SEARCHING AND NAVIGATING A DOCUMENT DATABASE

(75) Inventor: Bill Chau, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

This patent is subject to a terminal disclaimer.

(21) Appl. No.: 11/027,440

(22) Filed: Dec. 30, 2004

(65) Prior Publication Data

US 2005/0108225 A1     May 19, 2005

Related U.S. Application Data

(63) Continuation of application No. 09/906,404, filed on Jul. 16, 2001, now Pat. No. 6,865,568.

(51) Int. Cl.
    *G06F 17/30*      (2006.01)

(52) U.S. Cl. .................. 707/3; 707/1; 707/2; 707/4; 707/5; 707/100

(58) Field of Classification Search ................ 707/1–5
See application file for complete search history.

(56) References Cited

U.S. PATENT DOCUMENTS

| 6,055,543 | A | * | 4/2000 | Christensen et al. ...... 707/104.1 |
| 6,081,814 | A | * | 6/2000 | Mangat et al. ........... 715/501.1 |
| 6,240,410 | B1 | | 5/2001 | Wical ........................... 707/4 |
| 6,408,294 | B1 | | 6/2002 | Getchius et al. ................ 707/5 |
| 6,631,496 | B1 | | 10/2003 | Li et al. ..................... 715/200 |
| 6,643,642 | B1 | * | 11/2003 | Habegger ........................ 707/5 |
| 6,865,568 | B2 | | 3/2005 | Chau ............................. 707/3 |
| 7,043,488 | B1 | | 5/2006 | Baer et al. .................. 707/101 |
| 2002/0010651 | A1 | | 1/2002 | Cohn et al. .................. 705/26 |
| 2002/0065835 | A1 | | 5/2002 | Fujisaki ...................... 707/200 |
| 2002/0161800 | A1 | * | 10/2002 | Eld et al. .................... 707/512 |
| 2002/0198866 | A1 | | 12/2002 | Kraft et al. ..................... 707/3 |

(Continued)

OTHER PUBLICATIONS

U.S. Final Office Action dated Apr. 1, 2008 cited in U.S. Appl. No. 11/027,419.

(Continued)

*Primary Examiner*—Cam-Linh Nguyen
(74) *Attorney, Agent, or Firm*—Merchant & Gould

(57) ABSTRACT

A method, apparatus, and computer readable medium for searching and navigating a document database is provided. Document categories are assigned unique numeric category identifiers. Each document in a database is assigned to one of the document categories. Metadata is associated with each electronic document that includes the numeric category identifier corresponding to the category assigned to the document. The database may be searched or browsed based on category by utilizing the metadata. URLs may also be embedded in a Web page that includes a list of document identifiers and an index. The list of document identifiers is a list containing the identities of an arbitrary number of search results. The index identifies one of the documents in the list of document identifiers to be retrieved. When such a URL is selected, a Web server computer utilizes the list of document identifiers and the index to identify the document to be returned.

18 Claims, 14 Drawing Sheets

U.S. PATENT DOCUMENTS

2005/0114330 A1    5/2005   Chau .......................... 707/5

OTHER PUBLICATIONS

Bayraktar, M. et al., "A Web Art Gallery," Digital 98 Libraries, Third ACM Conference on Digital Libraries, Jun. 23-26, 1998, Pittsburgh, PA, pp. 277-278.

Chen et al., "Real-time Adaptive Feature and Document Leaving for Web Search," Journal of the American Society for Information Science and Technology, vol. 52, No. 8, Jun. 2001, pp. 655-665.

Hu, "WebClass: Web Document Classification Using Modified Decision Trees," Fifth International Conference on Computer Science and Informatics, Sep. 1999, pp. 1-5.

Matsuda et al., "Task-Oriented World Wide Web Retrieval by Document Type Classification," Proc. of the Eighth International Conference on Information Knowledge Management, CIKM'99, Nov. 2-6, 1999, Kansas City, MO, pp. 109-113.

Katz, et al., "Topic Distallation on Hierarchically Categorized Web Documents," Proc. 1999 Workshop on Knowledge and Data Engineering Exchange (KDEX'99), Nov. 7, 1999, Chicago, IL, pp. 34-41.

Yi et al., "Metadata Based Web Mining for Topic-Specific Information Gathering," *Electronic Commerce and Web Technologies*, First International Conference, EC-Web 2000, London, UK, Sep. 4-6, 2000, pp. 359-368.

Martin et al., "Embedding Knowledge in Web Documents," *Computer Networks*, vol. 31, Nos. 11-16, Proc. of 8$^{th}$ International WWW Conference, May 11-14, 1999, Toronto, Canada, pp. 1403-1419.

Hsu et al., "Constructing Personal Digital Library by Multi-Search and Customized Category," Proc. of 10$^{th}$ IEEE International Conference on Tools with Artificial Intelligence, Nov. 10-12, 1998, Taipei, Taiwan, R.O.C., pp. 148-155.

Nam et al., "Dynamic Management of URL Based on Object-Oriented Paradigm," Proc. 1998 International Conference on Parallel and Distributed Systems, Dec. 14-16, 1998, Tainan, Taiwan, R.O.C., pp. 226-230.

U.S. Office Action dated Jul. 27, 2007 cited in U.S. Appl. No. 11/027,419.

U.S. Office Action dated Sep. 23, 2008 cited in U.S. Appl. No. 11/027,419.

U.S. Final Office Action dated Mar. 23, 2009 cited in U.S. Appl. No. 11/027,419.

* cited by examiner

METHOD, APPARATUS, AND COMPUTER-READABLE MEDIUM FOR SEARCHING AND NAVIGATING A DOCUMENT DATABASE

CROSS-REFERENCE TO RELATED APPLICATIONS

This patent application is a continuation of U.S. patent application Ser. No. 09/906,404, entitled "Method, Apparatus, And Computer-Readable Medium For Searching And Navigating A Document Database," filed on Jul. 16, 2001 now U.S. Pat. No. 6,865,568 and assigned to the same assignee as this application. The aforementioned patent application is expressly incorporated herein, in its entirety, by reference.

TECHNICAL FIELD

The present invention generally relates to the field of computer databases. More specifically, the present invention relates to a method, apparatus, and computer-readable medium for searching and navigating a database containing electronic documents.

BACKGROUND OF THE INVENTION

The World Wide Web ("Web" or "WWW") provides access to many types of facilities for searching or browsing databases of electronic documents. Using such facilities, users can search large databases of electronic documents for individual documents matching user-provided search terms. Alternatively, a user may simply browse through electronic documents available in the database. These facilities are typically provided by a search engine application program executing on a Web server computer and provide a great deal of functionality for users performing research or otherwise trying to quickly locate a specific electronic document.

While currently available facilities for searching or browsing a document database provide a great deal of functionality, these facilities are not without their drawbacks. One of the main drawbacks of current search facilities is that these facilities do not provide functionality for searching or browsing the contents of a document database based upon a specific category of electronic document. For instance, currently available search facilities would not permit a user to specify that search results should be limited solely to a category of electronic document, such as resumes, business proposals, or financial statements. This limitation can be frustrating to a user trying to quickly locate a document belonging to a certain category of documents.

The currently available search facilities would similarly not permit a user to simply browse through all available documents belonging to a certain category, such as scripts, expense reports, or announcements. This limitation can be similarly frustrating to users wanting to browse through available documents in a certain category of documents.

Currently available facilities for searching and browsing a document database are also very computationally expensive. One reason these facilities consume such a large amount of computational resources is that a new search must be performed each time a new document is requested from a list of search results or documents available for browsing. For instance, when a user performs a search, a list of search results is returned to the Web browser. Each time a document is requested from the list of search results, a uniform resource locator ("URL") is transmitted to the search facility that requests that another search be performed using the same parameters as the previous search. However, the request also includes a parameter instructing the search facility to return a different document from the search results than previously returned. This parameter is called a "start hit" and is provided to the search facility to identify the document to be returned from the list of search results. In this manner, a user can view each of the documents identified in a list of search results.

While the "start hit" parameter allows the search facility to remain stateless with regard to client transactions, it also causes the consumption of large amounts of computational resources because many redundant searches must be performed. If a user requests many of the documents in a list of search results, the same search may be performed many times by the search facility. If the search facility has many users performing searches, the search facility may slow down considerably. This can be frustrating to a user that has to wait while many redundant searches are performed.

Accordingly, in light of the above, there is a need for a method, apparatus, and computer-readable medium for searching a document database that can organize documents by category, and that permits searching and browsing the database based upon document category. Moreover, there is a need for a method, apparatus, and computer-readable medium for navigating between documents in a document database that does not require a search each time a document is requested.

SUMMARY OF THE INVENTION

The present invention solves the above-described problems by providing a method, apparatus, and computer-readable medium for searching and browsing a document database. The method, apparatus, and computer-readable medium described herein is capable of organizing documents by document category and also provides a facility that allows users to search or browse the document database. The method, apparatus, and computer-readable medium provided herein also does not require a new search each time a document is selected from a list of search results or a list of documents available for browsing.

According to one actual embodiment of the present invention, a method is provided for searching a database comprising one or more electronic documents. According to this method, one or more document categories are defined and each document category is assigned a unique numeric category identifier. Each document in the database is then assigned to one of the document categories based upon the contents of the electronic document. Metadata is then associated with each of the electronic documents in the database that includes the numeric category identifier corresponding to the category assigned to the document. The metadata may be stored within the documents themselves or may be stored in a separate but associated file system.

Once metadata describing a category has been associated with each of the electronic documents in the database, the database may be searched or browsed based on category. For instance, a request may be submitted indicating that a search should be limited to documents assigned to a specified document category. In order to process such a request, the metadata associated with each of the documents in the database is searched for the numeric category identifier associated with the search request. Documents associated with metadata containing the specified numeric category identifier are then returned. A user may also browse electronic documents in the database based upon a specified category in a similar manner.

The present invention also provides an apparatus and computer-readable medium for performing this method.

According to another actual embodiment of the present invention, a method is provided for navigating among documents contained in a document database. According to this method, URLs may be embedded in a Web page containing search results that include a list of document identifiers and an index into the list of document identifiers. The list of document identifiers comprises a list containing the identities of an arbitrary number of search results. The index identifies one of the documents in the list of document identifiers. When such a URL is selected, the Web server utilizes the list of document identifiers and the index to identify the document to be returned without performing a search. The identified document can then be returned to the requesting Web browser. Similar URLs may be constructed for browsing documents by requesting a document "previous" or "subsequent" to a current document. An apparatus and computer-readable medium are also provided for practicing this method.

DETAILED DESCRIPTION OF AN ILLUSTRATIVE EMBODIMENT

As described briefly above, the present invention provides a method, apparatus, and computer readable medium for searching and navigating a document database. Referring now to the figures, in which like numerals represent like elements, an illustrative embodiment of the present invention will be described. In the actual embodiment described herein, aspects of the present invention are embodied in a document gallery. In particular, aspects of the present invention are embodied in a template gallery Web site available from MICROSOFT CORPORATION, of Redmond, Wash. The template gallery Web site provides access to a document database containing document templates.

Through an interface provided by the template gallery Web site, users can search or browse document templates. A user can also preview a template to see how the selected template would appear in a word processor or other application. A user can also download a template to their local computer for editing when a desired template has been located. Additional aspects of the template gallery Web site will be described below. While aspects of the invention are described in conjunction with the template gallery Web site provided by MICROSOFT CORPORATION, it should be appreciated that the invention described and claimed herein may be utilized with any type of Web site, search engine, or other computer program that provides access to a database of electronic documents.

Figure 1:
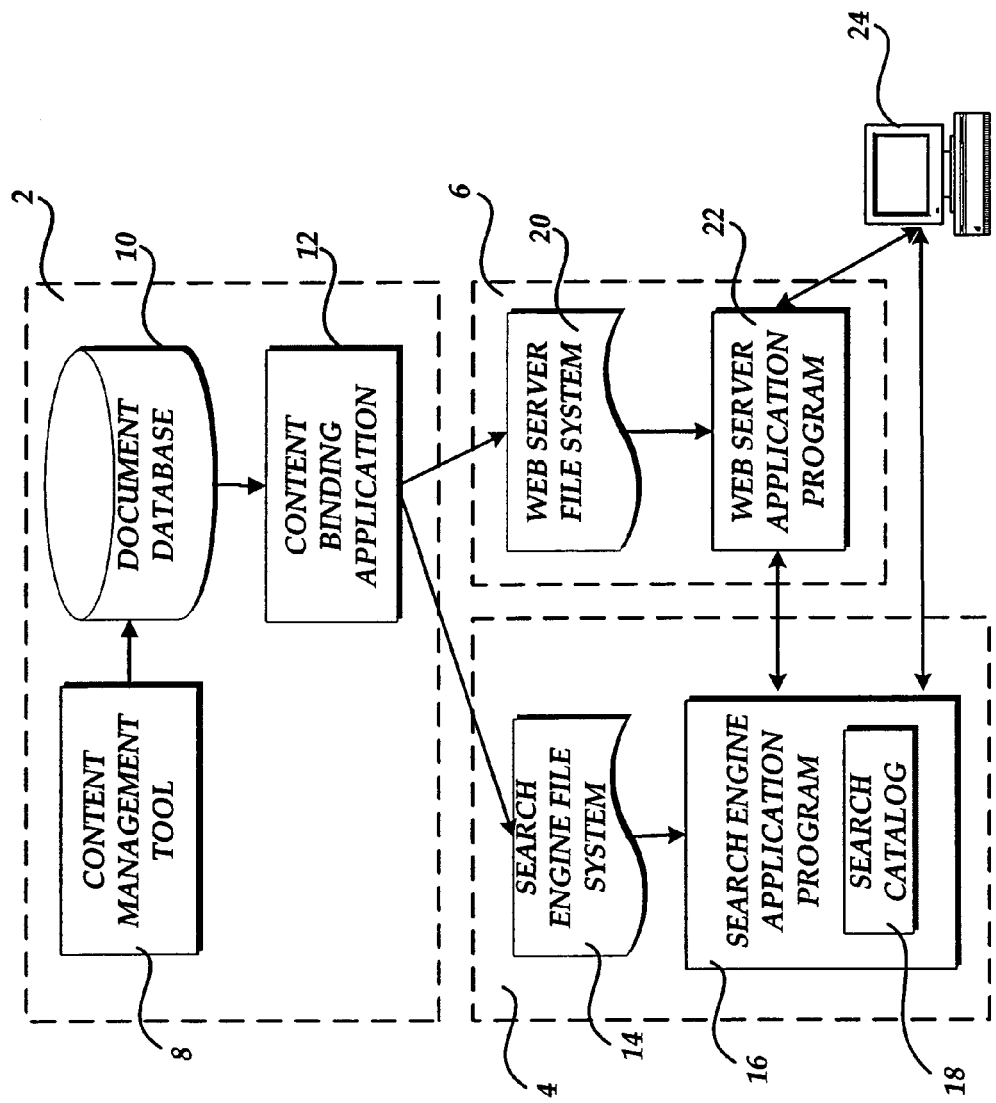
FIG. 1 is a block diagram showing an illustrative system architecture for a computer system embodying aspects of the present invention.

Referring now to FIG. 1, an illustrative computer system architecture for providing the template gallery will be described. The template gallery Web site is implemented utilizing three separate sub-systems: the content management and binding sub-system 2, the search engine sub-system 4, and the Web server sub-system 6. The content management and binding sub-system comprises a content management tool 8, a document database 10, and a content binding application 12. The content management tool 8 provides functionality for entering documents into the document database 10. According to the actual embodiment of the present invention described herein, the content management tool comprises several active server pages ("ASP") for entering documents into the document database 10. The document database 10 stores the electronic documents that are available through the template gallery Web site.

The content binding application 12 is a Web-based tool that utilizes several ASP pages to read the contents of the document database 10 and, based upon the contents, to create the search engine file system 14 and the Web server file system 20. The content binding application 12 also creates the default home page of the template gallery Web site. Additional details regarding the search engine file system 14 and the Web server file system 20 are described below with reference to FIGS. 3A and 3B, respectively.

The search engine sub-system 4 builds a search catalog 18 for searching the documents contained in the document database. The search engine sub-system 4 utilizes a search engine application program 16 to create the search catalog 18 and to receive and process search requests. The search engine application program 16 utilized in the actual embodiment of the present invention described herein is the SITE SERVER 3.0 application program from MICROSOFT CORPORATION. Other search engine application programs may also be used to implement the present invention.

The template gallery Web site utilizes the Web server sub-system 6 to interface with a Web browser executing on a client computer 24. As known to those skilled in the art, the Web server application program 22 receives and responds to requests for Web pages and other types of data. In order to process these requests, the Web server application program 22 utilizes the Web server file system 20. The Web server file system 20 contains the electronic documents served by the Web server application program and other information. Additional details regarding the Web server file system 20 will be described below in greater detail with respect to FIG. 3B. The Web server application program 22 utilized in the actual embodiment of the present invention described herein comprises the INTERNET INFORMATION SERVER application program from MICROSOFT CORPORATION. Other Web server application programs may also be used to implement the present invention.

Figure 2:
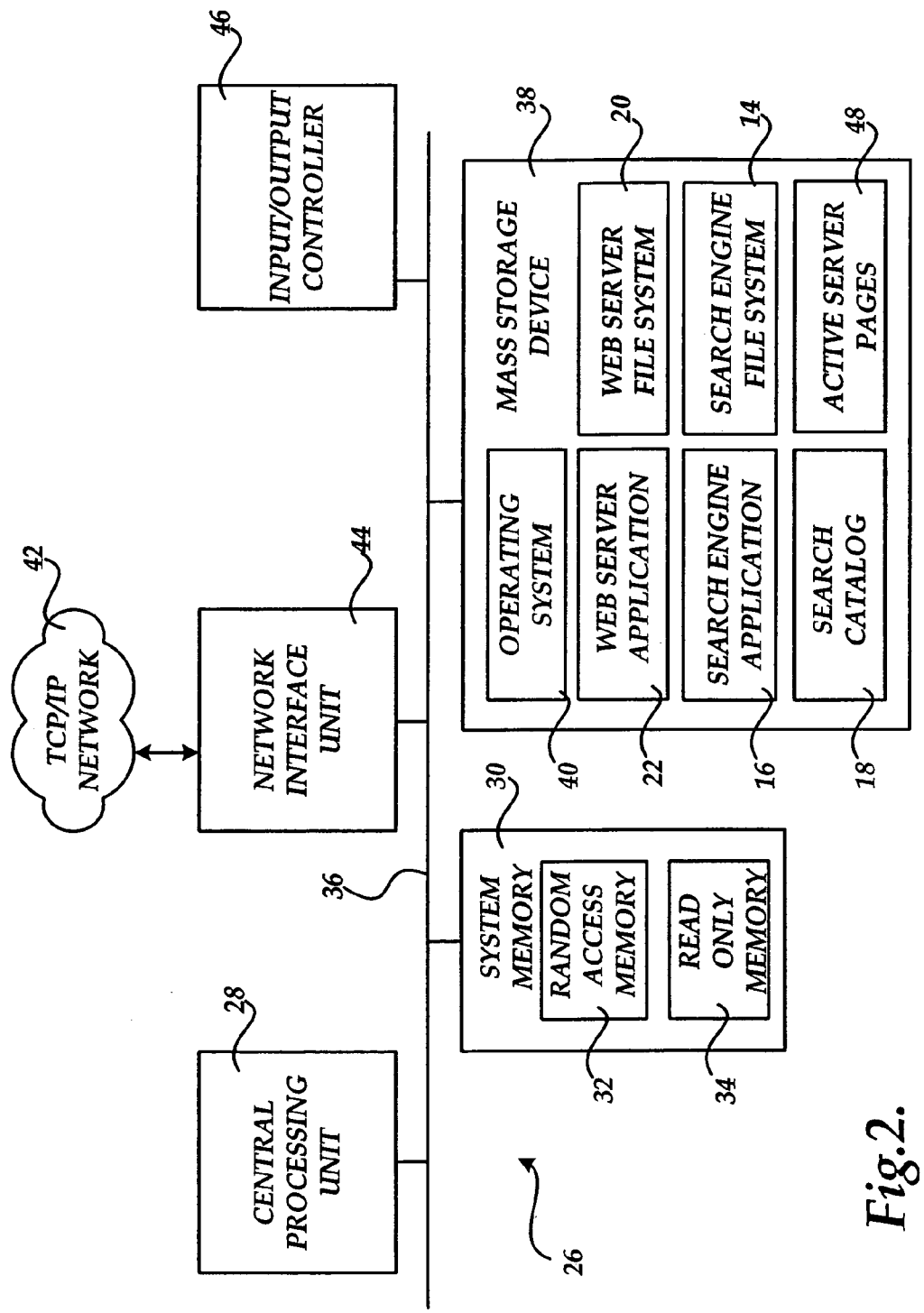
FIG. 2 is a block diagram showing a system architecture for a web server computer utilized in an actual embodiment of the present invention.

Turning now to FIG. 2, an illustrative computer architecture for the Web server computer 26 will be described. The Web server computer 26 is utilized to execute the content management and binding sub-system 2, the search engine sub-system 4, and the Web server sub-system 6 described above with respect to FIG. 1. Those skilled in the art should appreciate that these sub-systems may execute on a single Web server computer 26 or may be executed separately on different computers.

The computer architecture shown in FIG. 2 illustrates a conventional network server computer, including a central processing unit 28 ("CPU"), a system memory 30, including a random access memory 32 ("RAM") and a read-only memory ("ROM") 34, and a system bus 36 that couples the memory to the CPU 28. A basic input/output system containing the basic routines that help to transfer information between elements within the computer, such as during startup, is stored in the ROM 34. The computer further includes a mass storage device 38 for storing an operating system 40, application programs, and data.

The mass storage device 38 is connected to the CPU 28 through a mass storage controller (not shown) connected to the bus 36. The mass storage device 38 and its associated computer-readable media, provide non-volatile storage for the Web server computer 26. Although the description of computer-readable media contained herein refers to a mass storage device, such as a hard disk or CD-ROM drive, it should be appreciated by those skilled in the art that computer-readable media can be any available media that can be accessed by the Web server computer 26.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

As described briefly above, the Web server computer 26 operates in a networked environment using logical connections to remote computers through a TCP/IP network 42, such as the Internet. The Web server computer 26 may connect to the TCP/IP network 42 through a network interface unit 44 connected to the bus 26. The Web server computer 26 may also include an input/output controller 46 for receiving and processing input from a number of devices, including a keyboard or mouse. Similarly, the input/output controller 46 may provide output to a display screen, a printer, or other type of output device.

As mentioned briefly above, a number of program modules and data files may be stored in the mass storage device 38 and RAM 32 of the Web server computer 26, including an operating system 40 suitable for controlling the operation of a networked server computer, such as the WINDOWS 2000 operating system from MICROSOFT CORPORATION. The mass storage device 38 and RAM 32 may also store one or more application programs. In particular, the mass storage device 38 and RAM 32 may store a Web server application program 22 for receiving and responding to hypertext transport protocol ("HTTP") requests. In order to respond to such requests, the Web server application program 22 utilizes ASP pages 48. The ASP pages 48 utilized in the actual embodiment of the present invention described herein are discussed in greater detail below with reference to FIG. 11. The Web server application program 22 also utilizes a Web server file system 20, which is described in greater detail below with reference to FIG. 3B.

The mass storage device 38 and RAM 32 of the Web server computer 26 also store a search engine application program 16. The search engine application program 16 provides search facilities to the Web server application program 22. In order to provide these facilities, the search engine application program 16 maintains a search catalog 16. The search catalog 16 is created by the search engine application 16 on a periodic basis and is utilized at run-time to quickly locate the results of search queries. The search engine application program 16 also utilizes a search engine file system 14, which is described in greater detail below with respect to FIG. 3A.

Figures 3A, 3B:
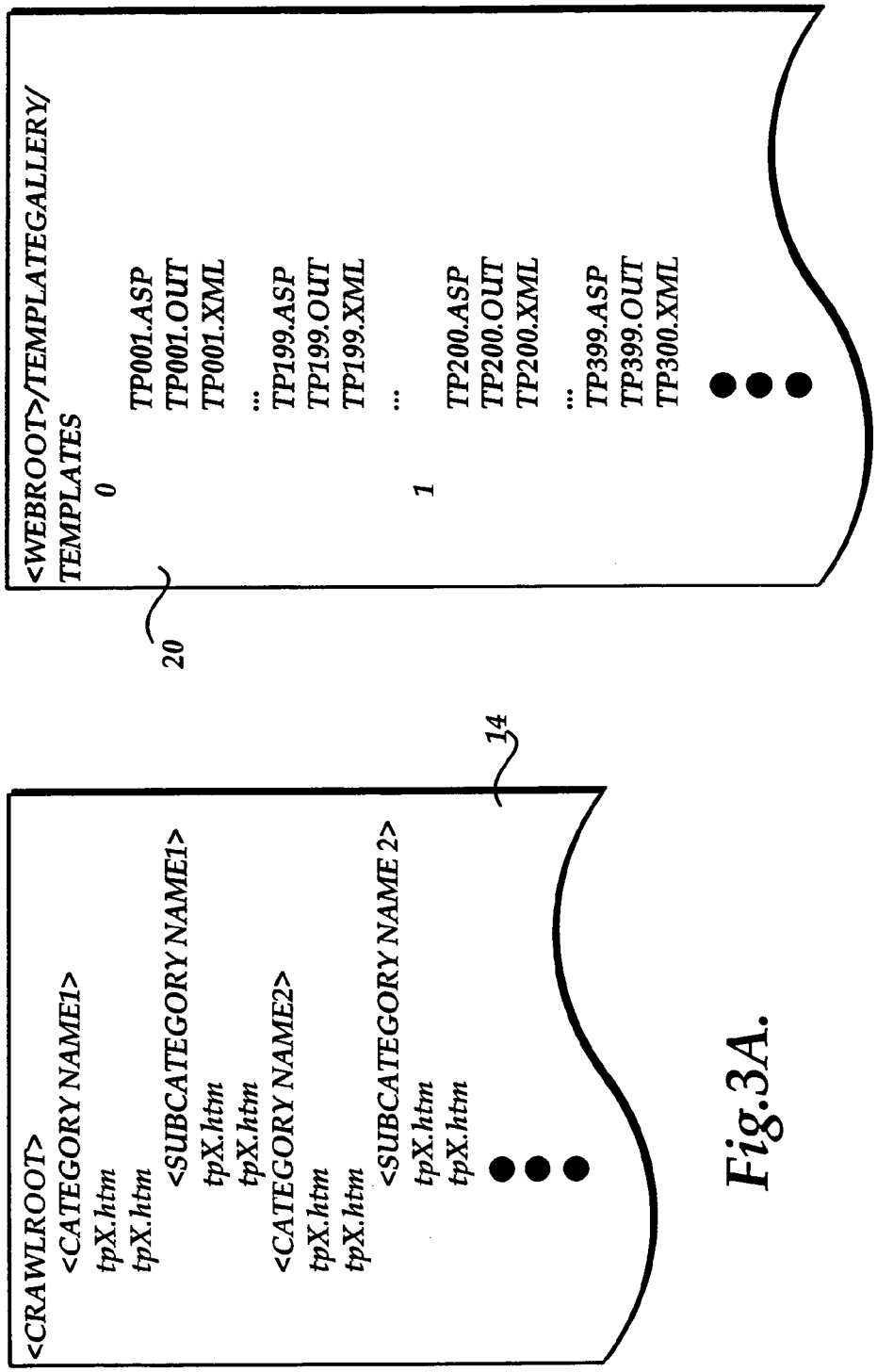
FIGS. 3A and 3B are block diagrams showing illustrative file system hierarchies for a search engine file system and a web server file system utilized in an actual embodiment of the present invention.

Referring now to FIG. 3A, the search engine file system 14 will be described. As described briefly above, the search engine file system 14 is utilized by the search engine application 16 to build the search catalog 18. The search engine file system 14 is organized using a directory structure that includes directory and sub-directory names corresponding to the category of documents contained therein. For instance, a top-level directory may be name "Business" and a sub-directory may be named "Resumes." Each of the sub-directories contains files named "tpX.htm", where "X" corresponds to a unique template_ID or document identifier from the database. Each "tpX.htm" file contains metadata about the corresponding electronic document, including document title, document category, author name, and publisher. Other types of metadata may also be included in the "tpX.htm" files. The search engine file system 14 may also contain files named "ctX.asp" that are category home pages for each of the categories identified in the search engine file system 14. The category home pages provide access to each of the documents identified in a sub-directory.

Turning now to FIG. 3B, the Web server file system 20 will be described. The Web server file system 20 contains three types of files: "tpX.xml", "tpX.asp", and "tpX.out", where "X" corresponds to a unique document identifier. These files are accessed by the Web server application 22 at run-time. The "tpX.asp" files contain the actual hypertext markup language ("HTML") version of the electronic documents for use in a browser preview mode. The "tpX.out" files contain the corresponding electronic documents for downloading. The "tpX.xml" files contain various attributes of the corresponding electronic documents, such as document title, author name, author link, and related documents, and are utilized by the Web server application 22 when creating Web pages identifying the electronic documents.

Figure 4:
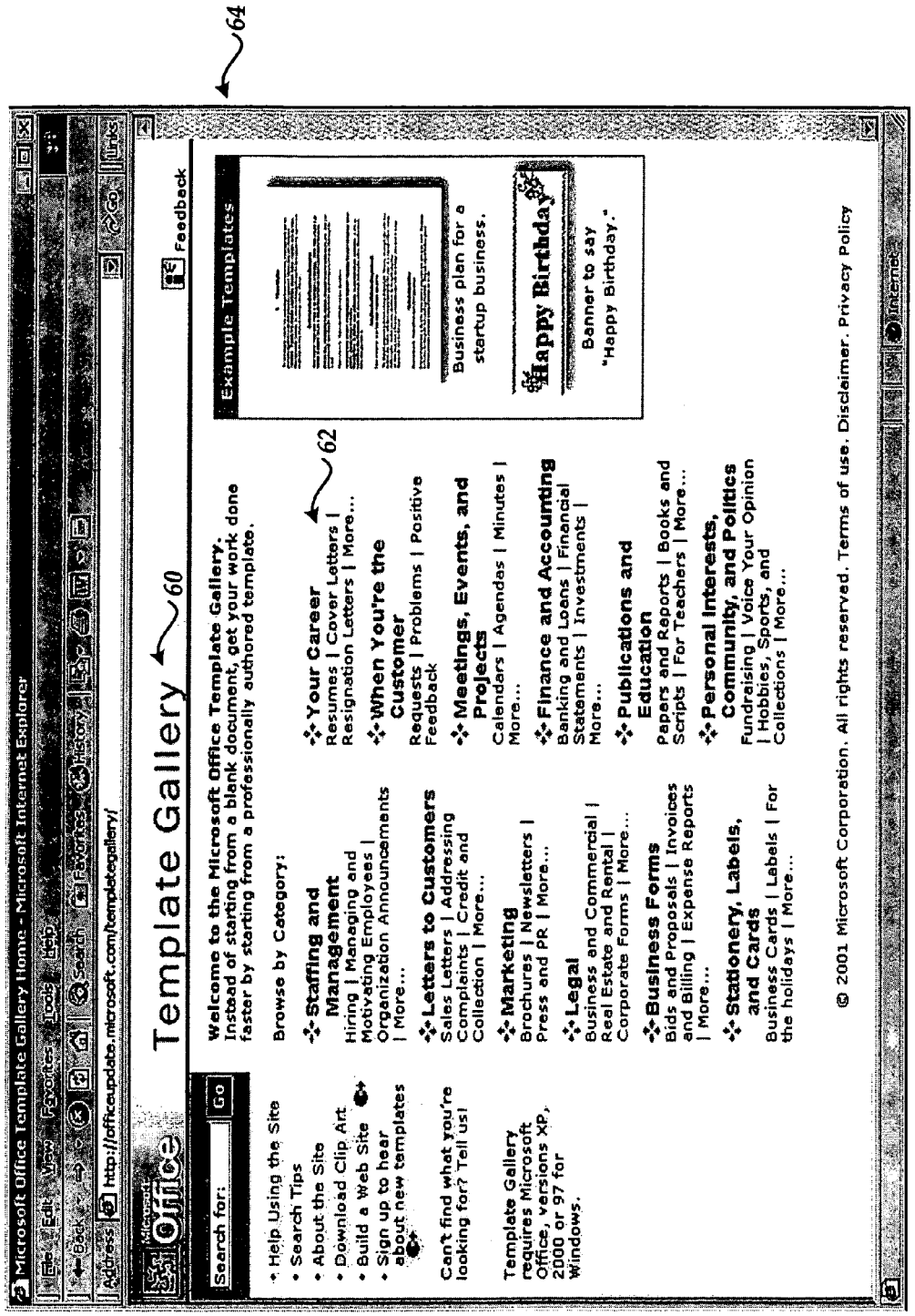
FIGS. 4-10 are screen diagrams showing aspects of a document gallery application program that embodies aspects of the present invention.

Referring now to FIG. 4, aspects of the template gallery Web site embodying aspects of the present invention will be described. FIG. 4 is a screen diagram showing the template gallery Web site 60 being viewed on a Web browser 64, such as INTERNET EXPLORER from MICROSOFT. The template gallery Web site 60 provides a convenient interface to a database of document templates. Through the Web site 60, users can browse through categories of document templates. In order to browse a category, the user simply selects one of the category links 62. The template gallery may also be searched for document templates by category and keyword.

Figure 5:
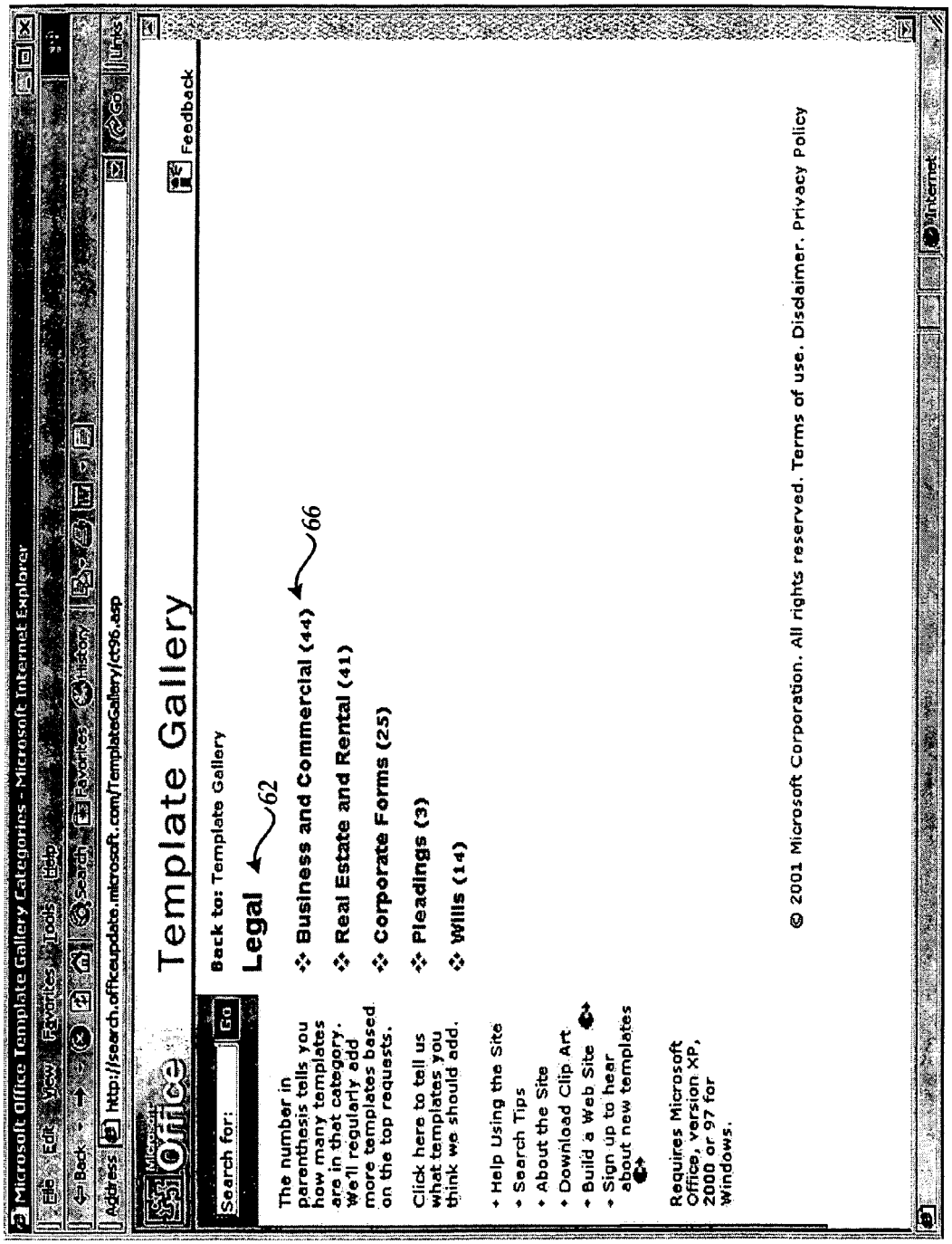

If a user selects one of the category links 62, such as the "Legal" category link, the user will be provided with the screen display shown in FIG. 5. As shown in FIG. 5, the "Legal" category is shown to the user with sub-categories 66, such as "Business and Commercial", "Real Estate and Rental", "Corporate Forms", "Pleadings", and "Wills". The user may select one of the sub-categories 66 to view document templates within that category. The user may also perform a search limited to documents within the "Legal" category by providing additional keywords.

Figure 6:
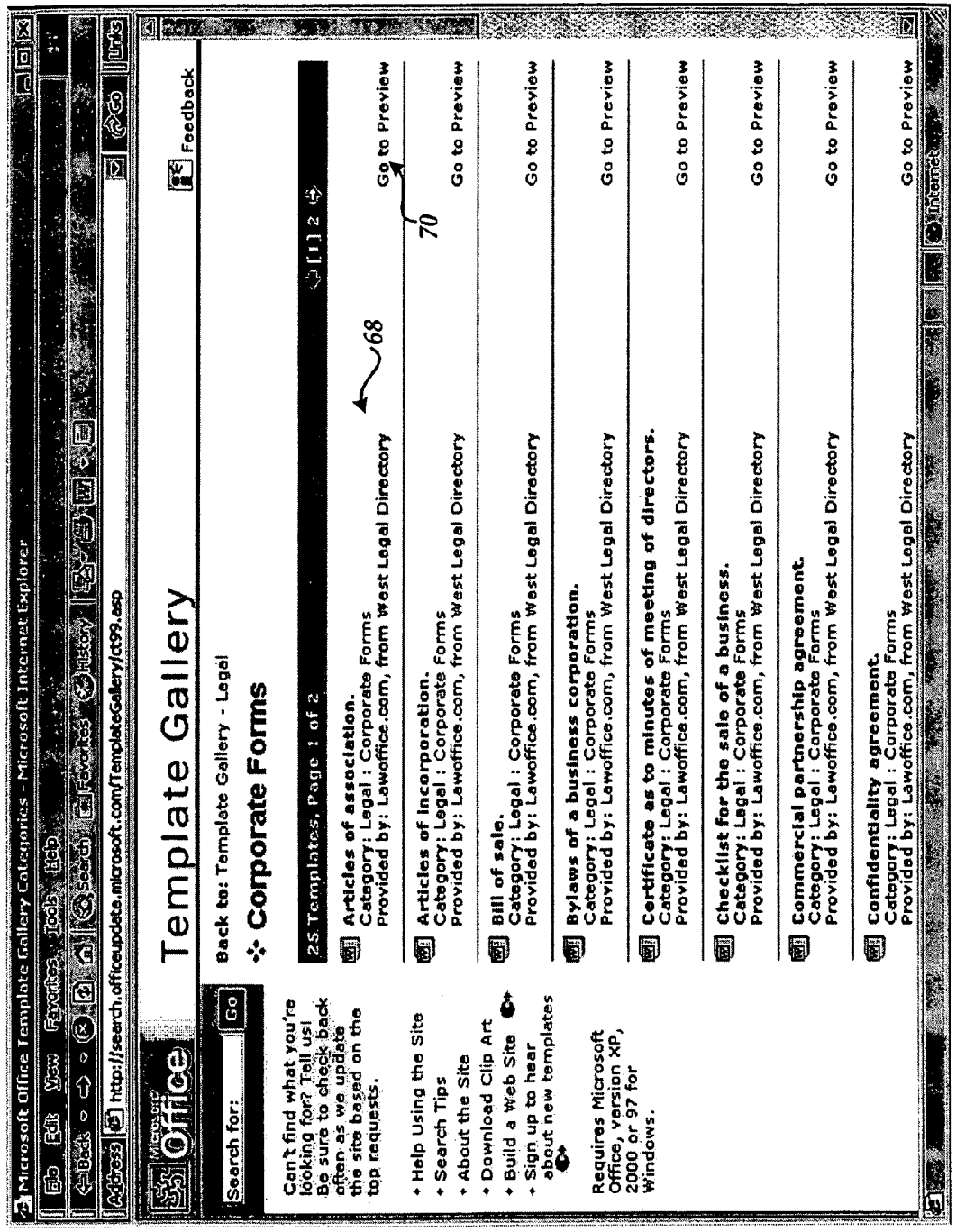

If a user selects the "Corporate Forms" sub-category, the user will be presented with the screen display shown in FIG. 6. As shown in FIG. 6, a list 68 of document templates within the selected sub-category is provided. The list 68 identifies each document template by name, category, and provider. The list 68 also includes a visual icon that identifies the application program that created the document template. Additional information may also be provided identifying each document template.

Figure 7:
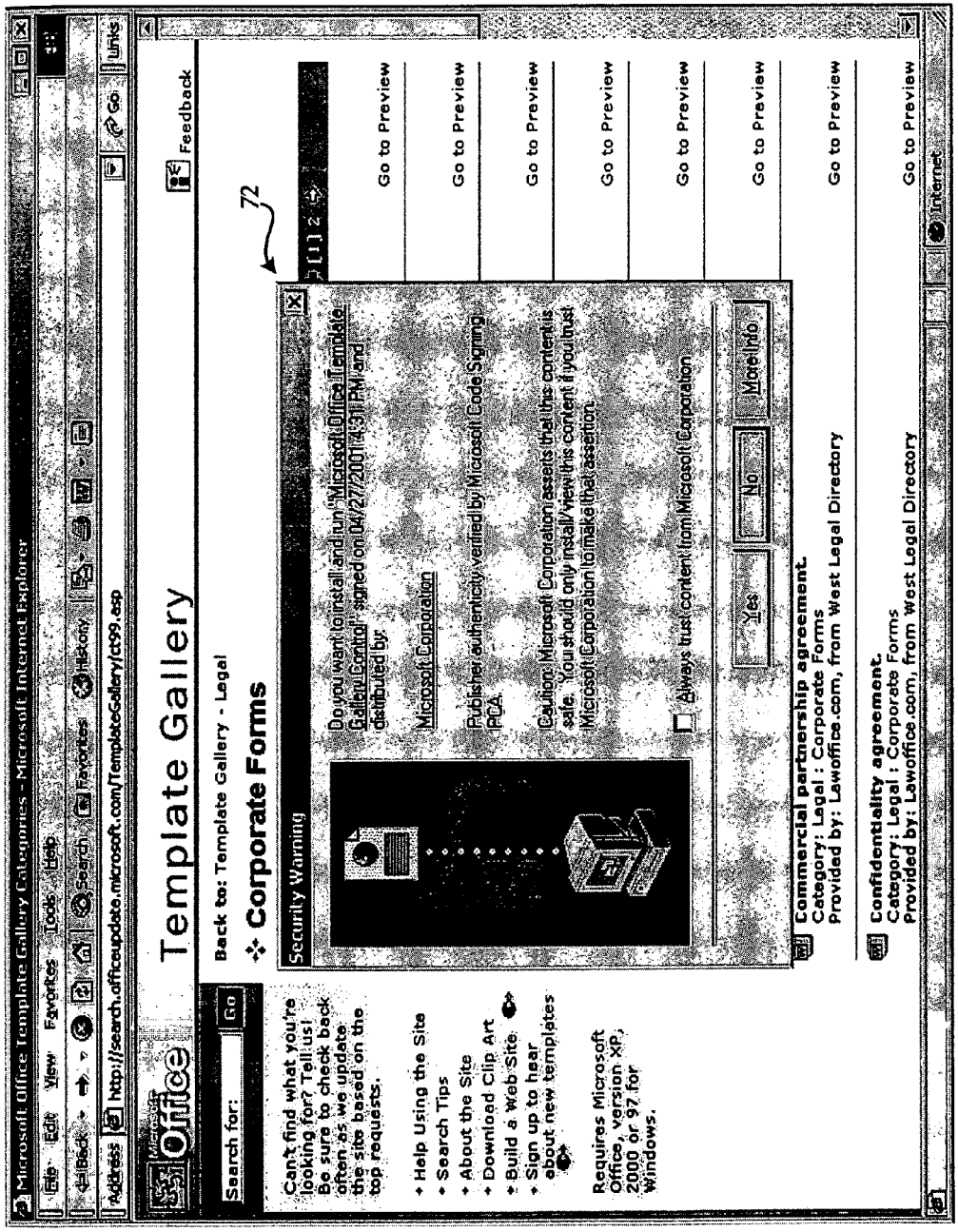

For each document template, a "Go To Preview" hyperlink 70 is also provided. The hyperlink 70 allows the user to preview the selected document template within the Web browser 64. If a user selects the hyperlink 70, the user will be presented with a visual display as shown in FIG. 7. As shown in FIG. 7, a dialog box is presented to the user inquiring as to whether the user would like to download and install the gallery control application. The gallery control application is a client-side application program that executes in conjunction with the Web browser 64 to display a preview of the document template and to download the document template itself. The gallery control application may be implemented as an ACTIVE X control or as a JAVA applet.

Figure 8:
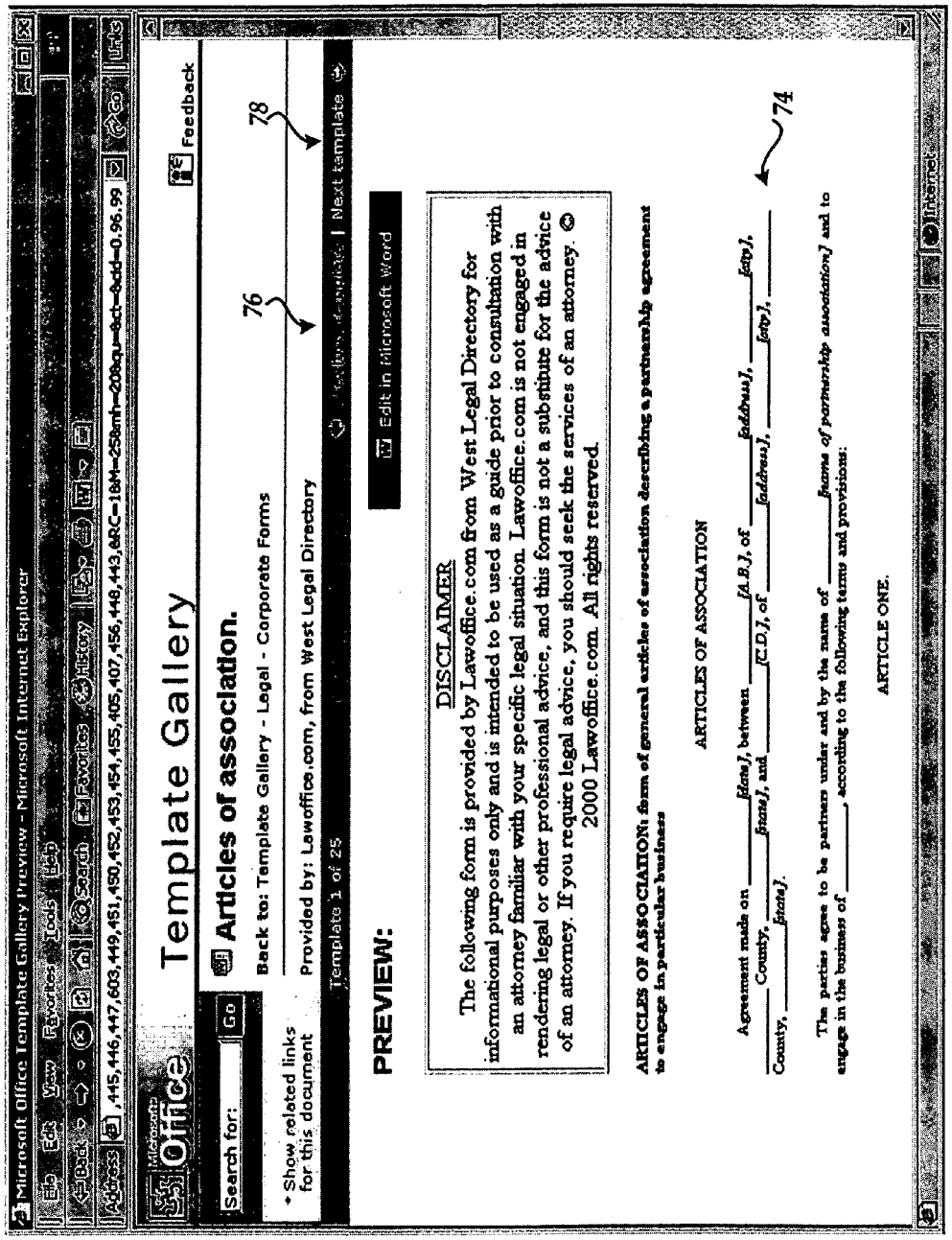

If a user agrees to download and install the gallery control application, the gallery control will be received and executed. The user will then be presented with the screen display shown in FIG. 8. As shown in FIG. 8, a preview 74 is provided for the selected document template. The preview 74 shows the selected document template, within the Web browser 64, exactly as it would appear when displayed within the creating application program.

The screen display shown in FIG. 8 also includes a "previous template" hyperlink 76 and a "next template" hyperlink 78. These hyperlinks allow a user to browse the document templates previous and next to the selected hyperlink. If the user has searched for the selected document template, these hyperlinks permit the user to browse to the next and previous document templates in the search results. Moreover, these hyperlinks allow the user to browse a next or previous document without requiring that the search engine perform another search. To accomplish this, a list of document identifiers and an index are added to the hyperlink as parameters. The list of document identifiers identifies a predetermined number of documents in the search results or category currently being browsed. The index identifies the document template to be displayed within the list of document identifiers. Table 1 shows the URL for the document displayed in FIG. 8.

TABLE 1 http://officeupdate.microsoft.com/TemplateGallery/templates/
2/tp440.asp?i=0&1=440,441,442,444,445,446,447,603,449,
451,450,452,453,454,455,405,407,456,448,443,&RC=1
&M=25&mh=20&qu=&ct=&cid=0.96.99

In the URL shown in Table 1, the "L=440,441,442,444, 445,446 . . . " parameter comprises the list of document identifiers and the "I=0" parameter is the index. This indicates to the Web server application program that the first document template identified in the list of document identifiers, counting from zero, should be transmitted. The "previous template" and "next template" hyperlinks are constructed in a similar manner that permits the Web server application program to locate the next or previous document without performing an additional search. The "next template" hyperlink 78 is shown in Table 2.

TABLE 2 http://officeupdate.microsoft.com/TemplateGallery/templates/
2/tp441.asp?i=1&1=440,441,442,444,445,446,447,603,449,
451,450,452,453,454,455,405,407,456,448,443,&RC=2
&M=25&mh=20&qu=&ct=&cid=0.96.99

Figure 9:
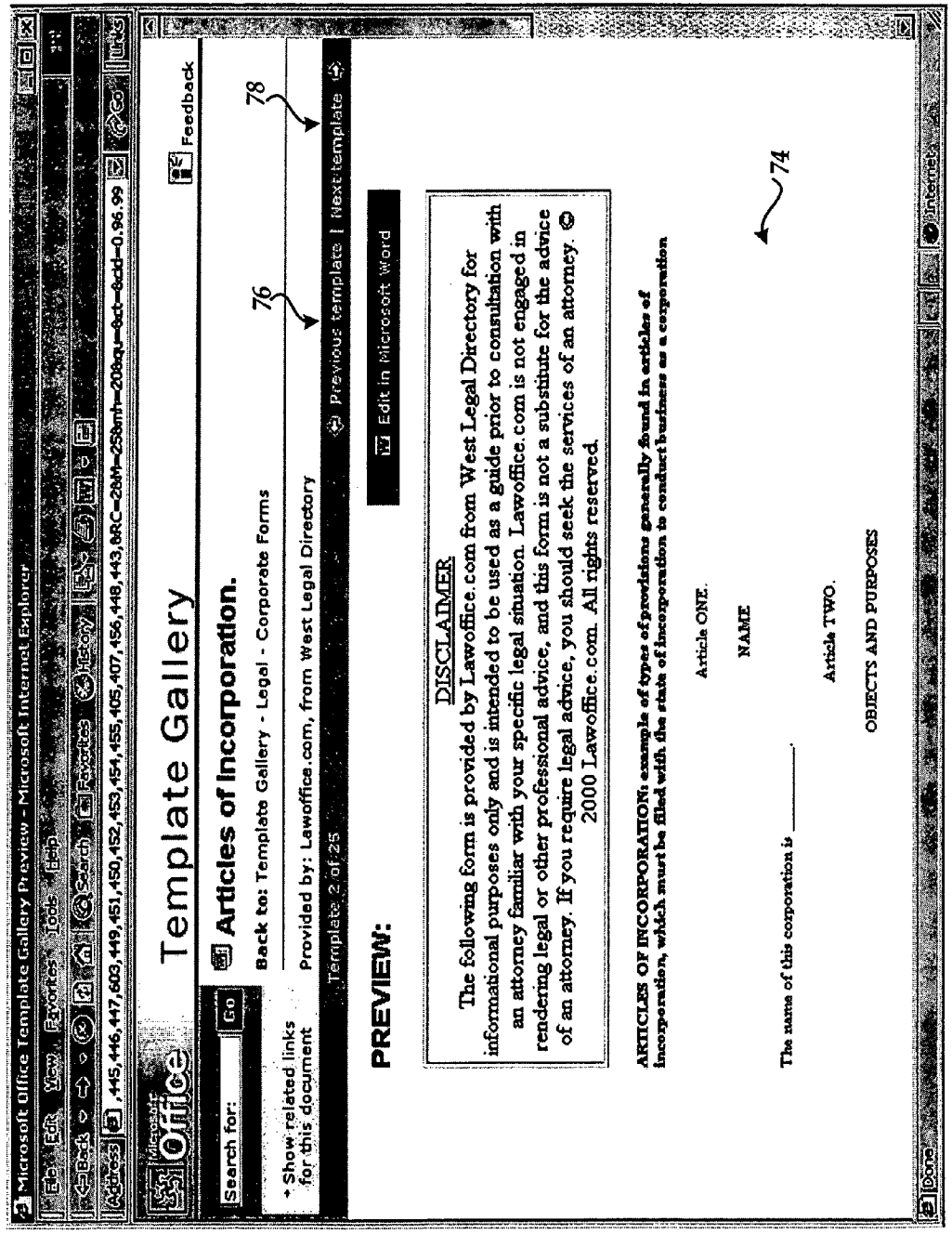
Figure 10:
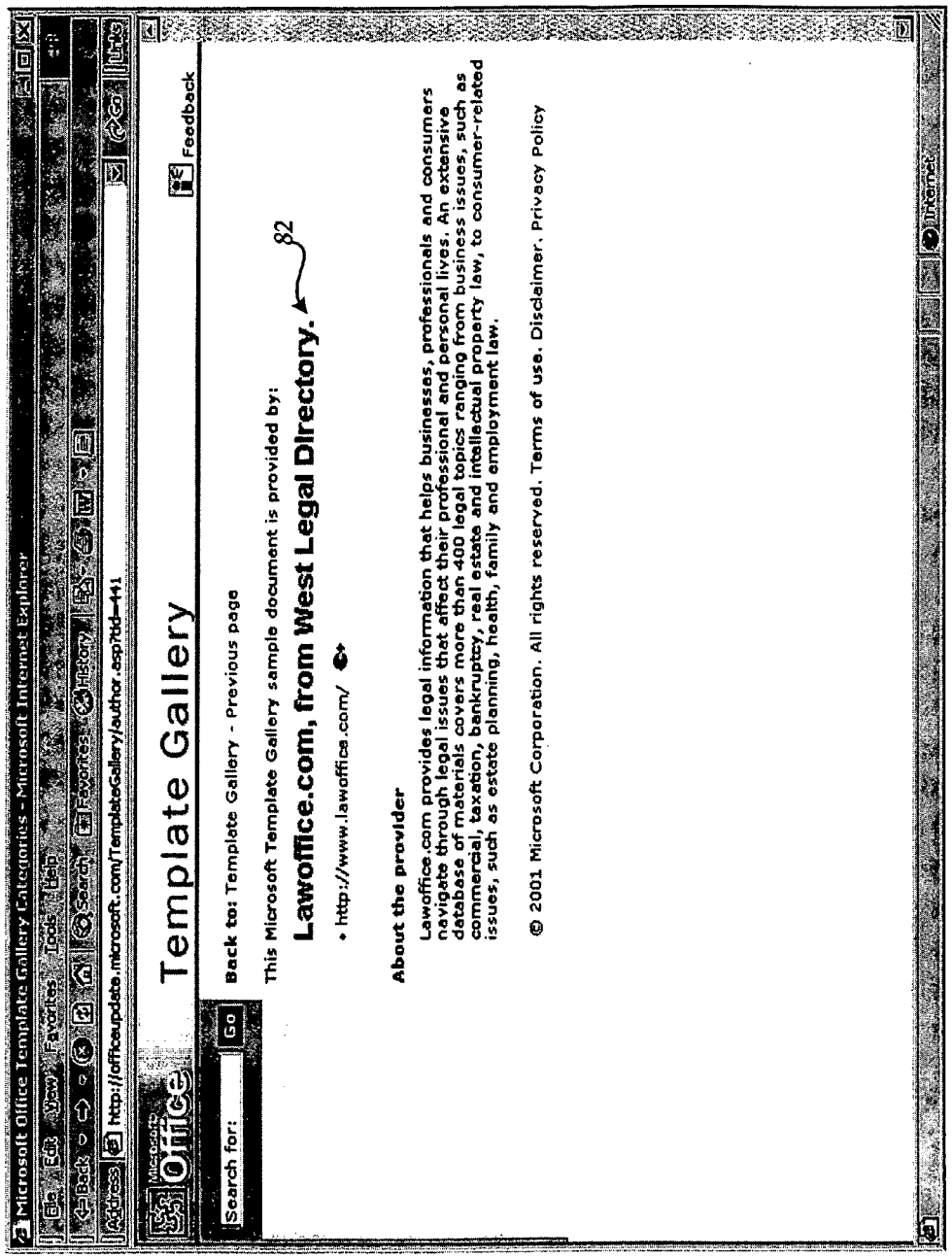

If the "next template" hyperlink 78 is selected, the URL is posted to the Web server application and the "next" document template is retrieved and displayed as shown in FIG. 9. The URL shown in Table 2 is identical to the URL shown in Table 1, except that the index has been incremented and the ASP page changed accordingly to identify the next document in the list of document identifiers. The URL has also been changed to identify the ASP page for displaying the current template (e.g. "tp440.asp" is changed to "tp441.asp"). If the "previous document" hyperlink 76 is selected, the index is decremented to identify the "previous" document. Additionally, a hyperlink may be selected to provide the screen display shown in FIG. 10, that identifies the provider 82 of the selected document template.

As shown in Table 2, the hyperlink 78 also includes a category identifier for the list of document identifiers. The category identifier uses dotted notation to describe a particular category. For instance, the hyperlink 78 includes the category identifier "0.96.99". This category identifier corresponds to the "Legal→Corporate Forms" category.

Figure 11:
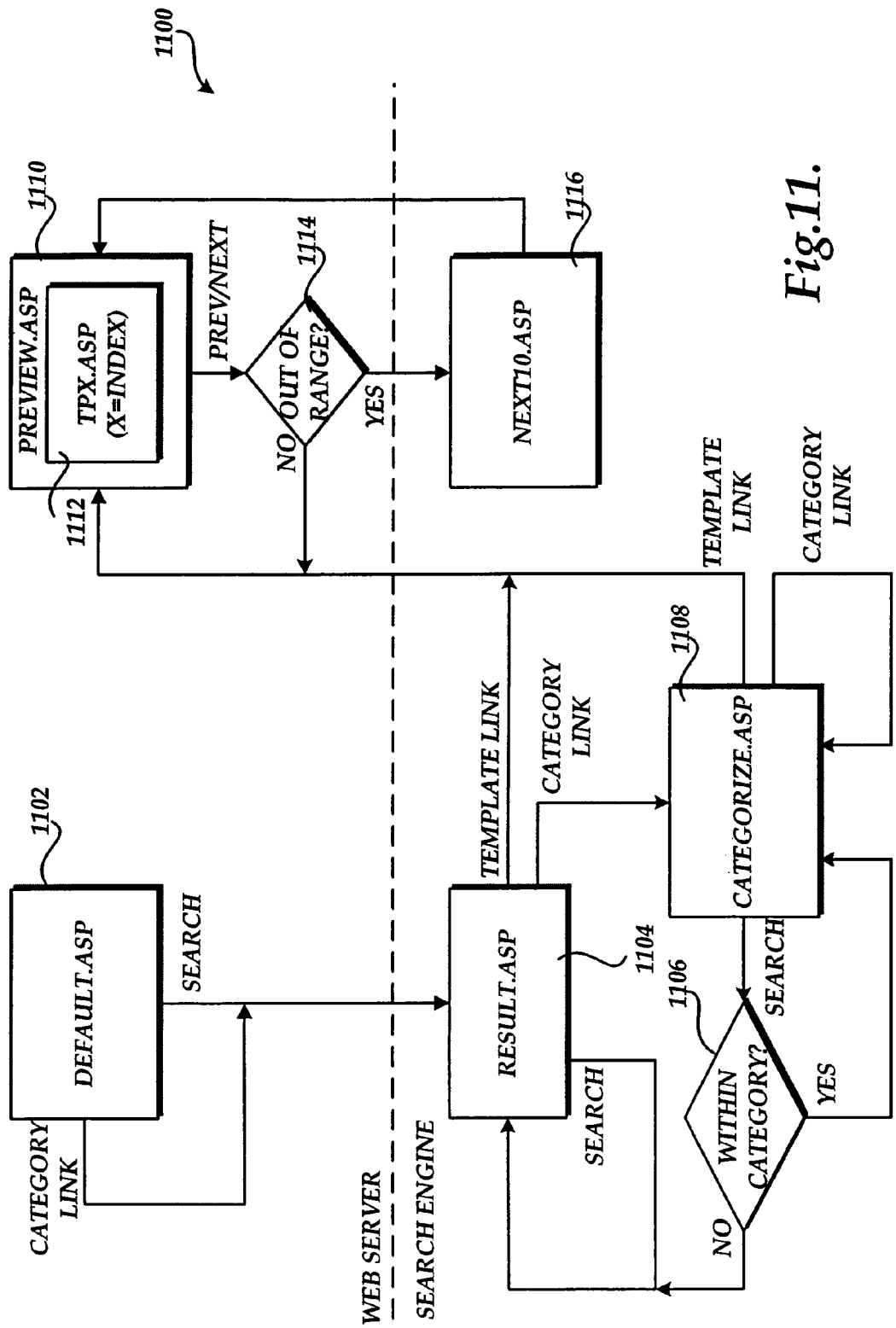
FIG. 11 is a flow diagram illustrating aspects of several script files utilized by a web server computer in an actual embodiment of the present invention.

FIG. 11 is a flow diagram that illustrates the interaction between ASP pages utilized by the Web server application program and the search engine application program. Turning now to FIG. 11, the Routine 1100 will be described. The Routine 1100 begins at block 1102, which represents the "default.asp" Web page. The "default.asp" Web page creates the main Web page for the template gallery. From the "default.asp" Web page, a user may select one of the category links to browse document templates in a particular category. A user may also provide a search term for searching the document database. If the user chooses a category link, parameters are passed to the search engine application identifying a source category to be browsed. If the user requests to search the document database, the query string provided by the user is passed. The Routine 1100 then continues to block 1104, where the "result.asp" Web page is generated by the search engine application.

At block 1104, the search results or document templates matching the requested category are displayed to the user. At block 1104, the user may request another search. If the user requests another search, the search parameters are received and the search is conducted as described above. At block 1104, the user may also select a hyperlink to a document template. If the user makes such a selection, the Routine 1100 branches to block 1110, described below. The user may also select a category link at block 1104 to view document templates in a specific category. If the user selects a category link, the Routine 1100 branches from block 1104 to block 1108.

At block 1108, the "categorize.asp" Web page is generated by the search engine application. The "categorize.asp" Web page generates a list of document templates within a specific category. At block 1108, a user may request to search the database of document templates. If the user makes such a selection, the Routine 1100 branches to block 1106, where a determination is made as to whether the user would like to restrict the search to documents contained within a specified category of document templates. For instance, a user may request that only resumes be searched for a particular search term. If the user does not request a category-based search, the Routine 1100 branches back to block 1104, where the "result.asp" Web page is called with the query string provided by the user. If the user does request a category-based search, the Routine 1100 branches back to block 1108, where the "categorize.asp" Web page is called with the category name and the query string provided by the user. The category-based search results are then displayed to the user.

If, at block 1108, a user selects a category link, the "categorize.asp" Web page is again called with a parameter identifying the specific category selected by the user. The sub-categories or document templates contained within the category are then displayed to the user. At block 1108, a user may also select a hyperlink directed to one of the document templates. If the user selects such a template link, the Routine 1100 branches to block 1110.

At block 1110, the "preview.asp" Web page is generated by the Web server application. The "preview.asp" Web page displays a preview of the selected document template in conjunction with the gallery control application described above. In particular, the "preview.asp" Web page generates a preview using the "tpX.asp" 1112 file corresponding to the selected document template. As described above with respect to FIG. 3B, "tpX.asp" files contain the actual HTML version of the electronic documents for use in a browser preview mode. The "preview.asp" Web page also generates hyperlinks for a next and a previous document. As described above, these hyperlinks include a list of document identifiers and an index. A method for generating these hyperlinks is described in greater detail below with respect to FIG. 14.

If, at block 1110, a user selects a hyperlink for a next or previous document, the Routine 1100 continues to block 1114. At block 1114, a determination is made as to whether the next or previous document template is out of range. In particular, a determination is made as to whether the index references a document template that is out of range of the list of document identifiers. If the index is not out of range, the Routine 1100 returns to block 1110, where the hyperlink is passed to the Web server application program and a preview for the next or previous document template is generated. If the index is out of range, the Routine 1100 branches from block 1114, to block 1116 where a predetermined number of additional documents are identified by the search engine application program. The identities of the additional documents are then utilized to create a new list of document identifiers and a new index. The Routine 1100 then returns back to block 1110, where a preview for the next or previous document template is generated.

Figure 12:
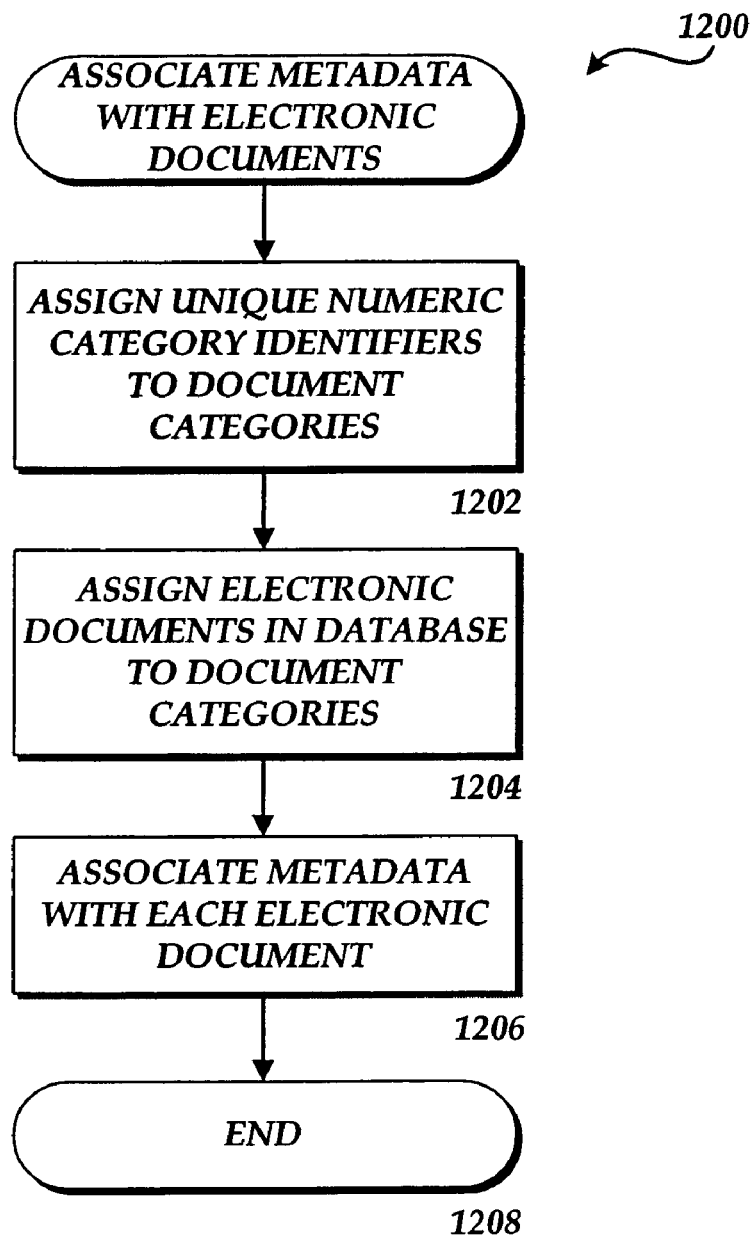
FIG. 12 is a flow diagram showing the operation of an illustrative routine for associating metadata with electronic documents in an actual embodiment of the present invention.

Referring now to FIG. 12, an illustrative Routine 1200 will be described for associating metadata with electronic documents. As described above, the present invention provides the ability to search and browse electronic documents based upon category. In order to provide this functionality, the electronic documents contained in the document database are associated with a category of electronic documents. The Routine 1200 describes an illustrative process for associating documents with pre-defined categories.

The Routine 1200 begins at block 1202, where unique numeric category identifiers are assigned to document categories. For instance, the number 123 may be assigned to a category containing resumes. Other categories may be similarly assigned numeric category identifiers. From block 1202, the Routine 1200 continues to block 1204, where each of the electronic documents stored in the document database are assigned to a document category. The documents are assigned to categories based upon content. So, for instance, a document comprising a resume would be assigned to a category for resumes. Document categories may also be subdivided into sub-categories. Each sub-category may also be given a unique numeric identifier.

From block 1204, the Routine 1200 continues to block 1206, where metadata is associated with each electronic document. The metadata comprises the unique numeric category identifier assigned to the document. The metadata may be stored in the electronic document itself or may be stored external to the document in another file. The metadata is then stored in the indexed catalog used by the search engine application program to search for documents. In this manner, the category metadata may be utilized to search for documents matching a certain unique category identifier. Moreover, additional metadata such as the identity of the provider or author of the document, a title of the document, or a text description of the document category to which the document is assigned may also be included. The metadata may also be utilized by the search engine application program when searching for documents. The Routine 1200 then continues to block 1208, where it ends.

Figure 13:
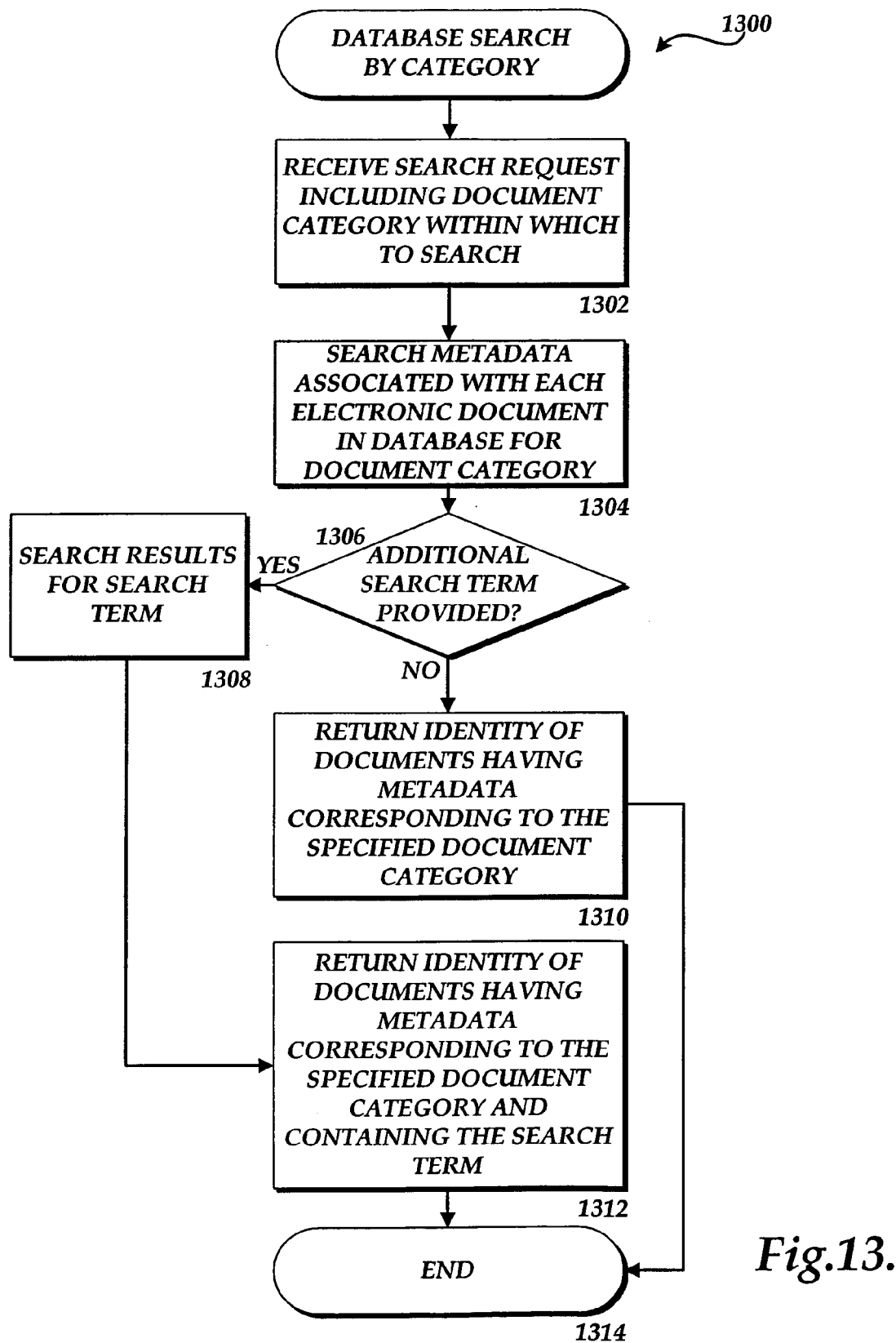
FIG. 13 is a flow diagram showing the operation of an illustrative routine for searching a database for electronic documents based upon categories in an actual embodiment of the present invention.

Referring now to FIG. 13, an illustrative Routine 1300 for searching a database of electronic documents will be described. The Routine 1300 begins at block 1302, where a request to search the database is received, including the identity of a document category within which to search. The Routine 1300 then continues to block 1304, where the metadata associated with each electronic document in the document database is searched for the specified document category. The Routine 1300 then continues to block 1306, where a determination is made as to whether a search term has been provided in addition to the document category. If a search term has been provided, the Routine 1300 branches to block 1308, where the results of the category search are again searched for the provided search term. The Routine 1300 then continues from block 1308 to block 1312, where the identities of documents associated with metadata corresponding to the specified document category and containing the search term are returned.

If, at block 1306, it is determined that no additional search term was provided, the Routine 1300 continues to block 1310. At block 1310, the identities of all electronic documents in the database associated with metadata corresponding to the specified document category are returned. From blocks 1310 and 1312, the Routine 1300 continues to block 1314, where it ends.

Figure 14:
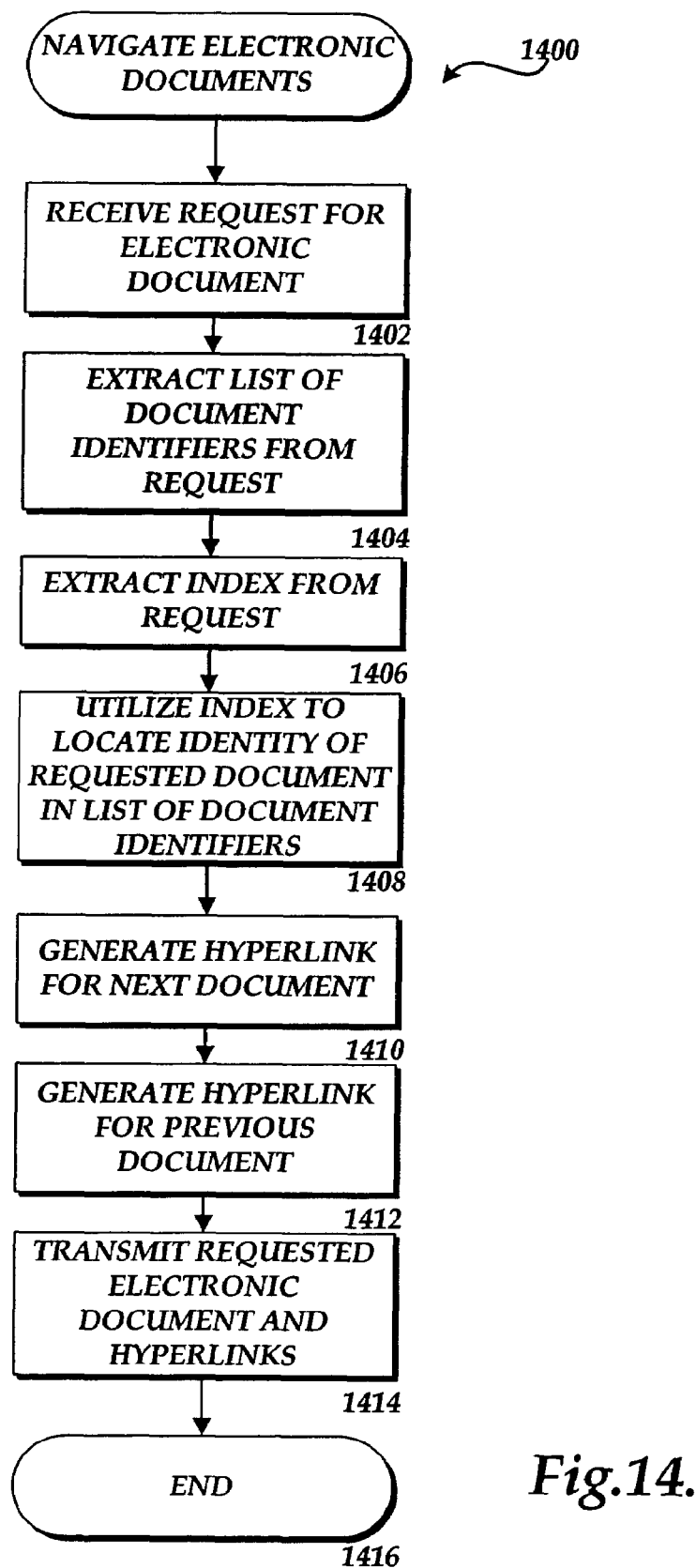
FIG. 14 is a flow diagram showing the operation of an illustrative routine for navigating between electronic documents according to an actual embodiment of the present invention.

Turning now to FIG. 14, an illustrative Routine 1400 will be described for navigating a database of electronic documents. The Routine 1400 begins at block 1402, where a request is received for an electronic document at the Web server application program. The request includes a list of document identifiers and an index into the list corresponding the requested electronic document. As described above, the list of document identifiers may be generated in response to a search request or in response to a request to browse documents in the database. The Routine 1400 continues from block 1402 to block 1404, where the list of document identifiers is extracted from the request. The Routine 1400 then continues to block 1406, where the index is also extracted from the request.

From block 1406, the Routine 1400 continues to block 1408, where the index is utilized to locate the identity of the requested document in the list of document identifiers. From block 1408, the Routine 1400 continues to block 1410, where a URL for the next document in the list of document identifiers is generated. The URL is generated by incrementing the index and determining whether the index exceeds the limits of the list of document identifiers. If the index exceeds the limits of the list of document identifiers, a new list is generated.

From block 1410, the Routine 1400 continues to block 1412, where the URL for the previous document in the list of document identifiers is generated. The URL is generated in the same manner as for the next document, except that the index is decremented. From block 1412, the Routine 1400 continues to block 1414, where the requested document, the URL for the next document, and the URL for the previous document are transmitted to the client computer that requested the electronic document. The Routine 1400 then continues to block 1416, where it ends.

Based on the foregoing, it should be appreciated that the present invention provides a method, apparatus, and computer-readable medium for searching and navigating a document database. The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-readable storage medium comprising computer-executable instructions which, when executed by a computer, cause the computer to perform a method for searching a database comprising a plurality of electronic documents, said method comprising:
    assigning a first unique numeric category identifier to each of a plurality of document categories;
    assigning a second unique numeric category identifier to each of a plurality of document sub-categories, wherein each of the plurality of document sub-categories is associated with at least one of the plurality of document categories;
    assigning each of said electronic documents to at least one of the plurality of document categories and at least one of the plurality of document sub-categories associated with the assigned at least one of the plurality of document categories, wherein the assigned at least one of the plurality of document categories and the assigned at least one of the plurality of document sub-categories is based upon the content of each of said electronic documents;
    associating metadata with each of said electronic documents, said metadata comprising said first unique numeric category identifier corresponding to said document category assigned to each of said electronic documents and said second unique numeric category identifier corresponding to said document sub-category assigned to each of said electronic documents;
    receiving a request to search said database, said search limited to documents assigned to a specified document category associated with said request and wherein said database comprises a second computer-readable storage medium;
    searching said metadata associated with each of said electronic documents; returning an identity of each of said electronic documents associated with metadata having a numeric category identifier associated with said specified document category, said identities returned as a list of document identifiers and an index into said list corresponding to a one of said electronic documents;
    receiving a request to display a second document, the second document identified in said list; and
    utilizing said index and said list to identify said second document and to retrieve said second document from said database without performing a second search of the metadata associated with each of said electronic documents.

2. The computer-readable storage medium of claim 1, wherein said metadata for each of said electronic documents is stored in an indexed catalog.

3. The computer-readable storage medium of claim 1, wherein said request to search said database further comprises a search term and wherein returning an identity comprises returning an identity of each of said electronic documents associated with metadata having a numeric category identifier associated with said specified document category and containing said search term.

4. The computer-readable storage medium of claim 1, wherein said electronic documents comprise document templates.

5. The computer-readable storage medium of claim 1, wherein said metadata further comprises an identity of an author or provider of each of said electronic documents.

6. The computer-readable storage medium of claim 5, wherein said metadata further comprises a text description of said document category to which each of said electronic documents is assigned.

7. The computer-readable storage medium of claim 6, wherein said metadata further comprises a title for each of said electronic documents.

8. A computer-readable storage medium comprising computer-executable instructions which, executed by a computer, cause the computer to perform a method for navigating between documents stored in a database without performing a document search each time a document is requested, each of said electronic documents identified by a unique document identifier, said method comprising:
    assigning each of said electronic documents to at least one of a plurality of document categories and at least one document sub-category associated with the at least one of the plurality of document categories;
    assigning each of said electronic documents a document identifier associated with the assigned at least one of the plurality of document categories and the assigned at least one document sub-category;
    receiving a request for at least one of said electronic documents, said request comprising a list of assigned document identifiers and an index into said list corresponding to said requested electronic document, said list and said index provided previously with a second one of said electronic documents; and
    in response to said request, utilizing said index and said list of document identifiers to identify said requested electronic document from said plurality of electronic documents without performing a search of said database, wherein said database comprises a second computer-readable storage medium, and transmitting said requested electronic document.

9. The computer-readable storage medium of claim 8, wherein said requested electronic document comprises one of said plurality of electronic documents identified in said list of document identifiers previous to a previously transmitted electronic document.

10. The computer-readable storage medium of claim 9, further comprising:
    decrementing said index;
    generating a hypertext link comprising said decremented index and said list of document identifiers; and
    transmitting said hypertext link with said requested electronic document.

11. The computer-readable storage medium of claim 9, further comprising:

incrementing said index;

generating a hypertext link comprising said incremented index and said list of document identifiers; and transmitting said hypertext link with said requested electronic document.

12. The computer-readable storage medium of claim 8, wherein said requested electronic document comprises one of said plurality of electronic documents identified in said list of document identifiers and subsequent to a previously transmitted electronic document.

13. The computer-readable storage medium of claim 8, wherein each of said plurality of documents in said database is named consistently with a corresponding document identifier.

14. The computer-readable storage medium of claim 13, wherein said list of document identifiers is generated in response to a single search of said database.

15. The computer-readable storage medium of claim 8, wherein said list of document identifiers is generated in response to a single request to browse said database.

16. A storage system for searching a database comprising a plurality of electronic documents, said system comprising:

a server computer operative to execute a server application program, the server application program operative to:

assign a first unique numeric category identifier to each of a plurality of document categories;

assign a second unique numeric category identifier to each of a plurality of document sub-categories, wherein each of the plurality of document sub-categories is associated with at least one of the plurality of document categories;

assign each of said electronic documents to one of said document categories and one of said document sub-categories associated with said document category, said assigned category and said assigned sub-category based upon the content of each of said electronic documents;

associate metadata with each of said electronic documents, said metadata comprising said first unique numeric category identifier corresponding to said document category assigned to each of said electronic documents and said second unique numeric category identifier corresponding to said document sub-category assigned to each of said electronic documents;

receive a request to search said database, said search limited to documents assigned to a specified document category associated with said request;

search said metadata associated with each of said electronic documents;

return an identity of each of said electronic documents associated with metadata having a numeric category identifier associated with said specified document category, said identities returned as a list of document identifiers and an index into said list corresponding to a one of said electronic documents;

receive a request to display a second document, the second document identified in said list; and utilize said index and said list to identify said second document and to retrieve said second document from said database without performing a second search of the metadata associated with each of said electronic documents.

17. The storage system of claim 16, wherein said request to search said database further comprises a search term and wherein returning an identity comprises returning an identity of each of said electronic documents associated with metadata having a numeric category identifier associated with said specified document category and containing said search term.

18. The storage system of claim 16, wherein said electronic documents comprise document templates.

* * * * *